United States Patent [19]

Sackett

[11] Patent Number: 4,963,857
[45] Date of Patent: Oct. 16, 1990

[54] TRANSLATABLE DUAL MAGNETS

[76] Inventor: Robert L. Sackett, 4943 Mt. Durbin Dr., San Diego, Calif. 92117

[21] Appl. No.: 371,070

[22] Filed: Jun. 26, 1989

[51] Int. Cl.$^5$ .............................................. G08B 21/00
[52] U.S. Cl. ............................. 340/606; 200/81.9 M; 116/267; 116/273; 73/861.13
[58] Field of Search ..................... 340/606; 73/861.13, 73/861.17, 722, DIG. 11; 200/81.9 M, 82 C, 82 E; 116/267, 273; 335/207

[56] References Cited

U.S. PATENT DOCUMENTS

| | | | |
|---|---|---|---|
| 3,611,220 | 10/1971 | Hoffman | 200/82 C |
| 3,683,691 | 8/1972 | Kivenson | 340/606 |
| 4,081,635 | 3/1978 | Moore | 200/82 E |
| 4,101,874 | 7/1978 | Denison et al. | 340/606 |
| 4,475,407 | 10/1984 | Kruncos | 340/606 |
| 4,499,347 | 2/1985 | Richards | 200/81.9 M |
| 4,694,161 | 9/1987 | Sacket | 73/861.13 |
| 4,788,534 | 11/1988 | Engelhardt | 200/81.9 M |

Primary Examiner—Donnie L. Crosland
Assistant Examiner—Jill Jackson
Attorney, Agent, or Firm—Frank D. Gilliam

[57] ABSTRACT

A fluid flow detection device includes a fluid conduit, at least one magnet translatable by action of the flow of fluid (gas or liquid) in said conduit and a switch which is caused to change state between "on" and "off" relative to the position of the magnet in the conduit. The switch includes several embodiments as does the support for the at least one magnet. In one embodiment the conduit must be positioned in a vertical position in other embodiments the conduit can take any attitude position. A shut off valve can be employed in combination with the flow detection device.

13 Claims, 3 Drawing Sheets

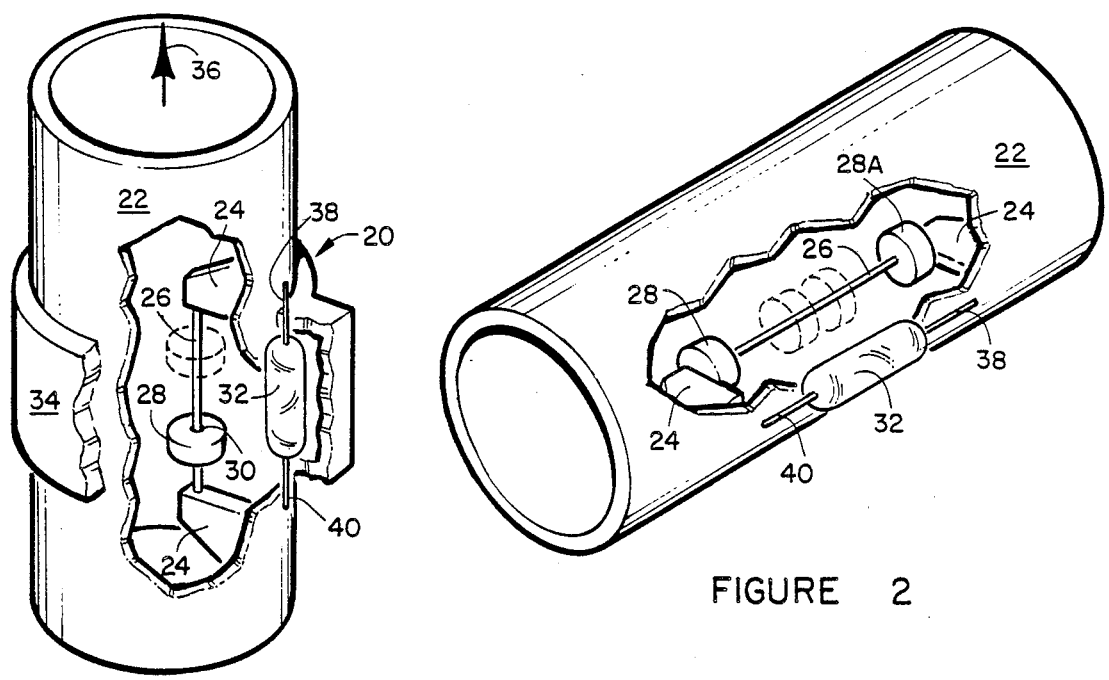
FIGURE 1
FIGURE 2
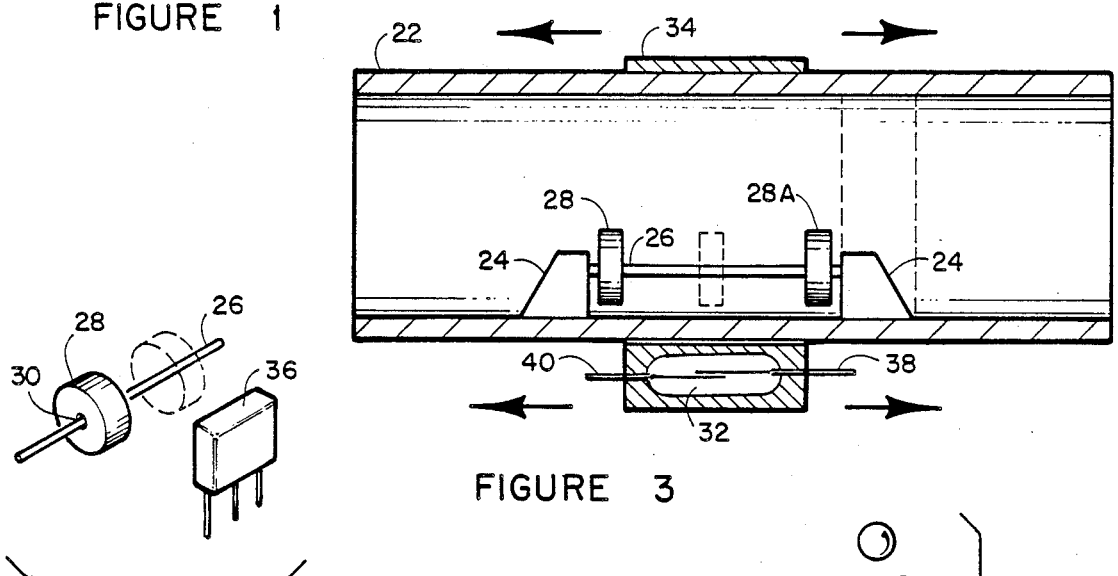
FIGURE 3
FIGURE 4
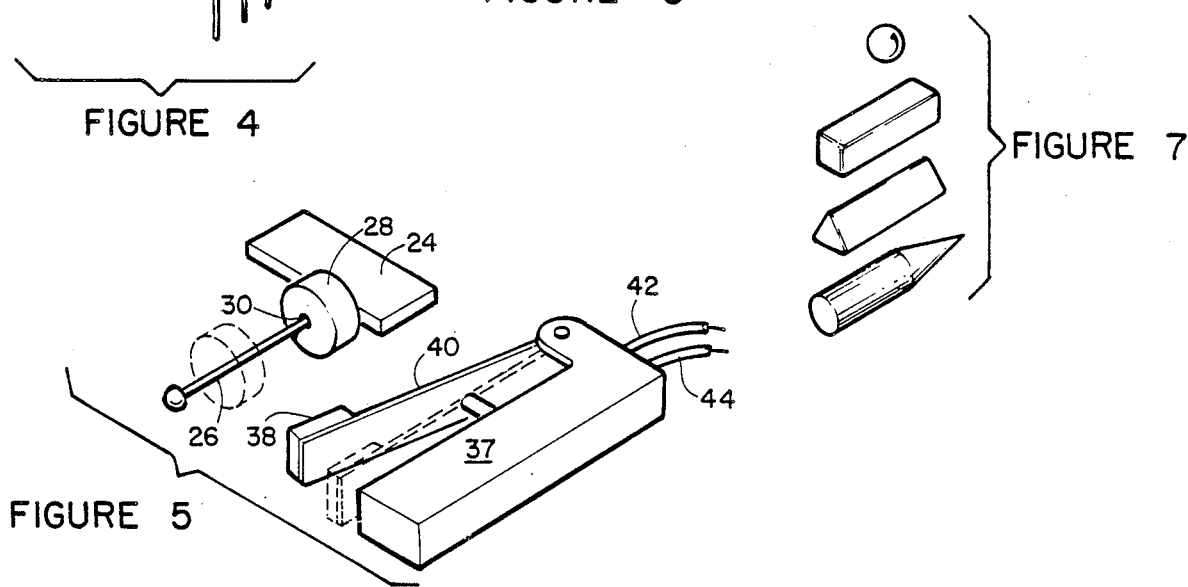
FIGURE 5
FIGURE 7

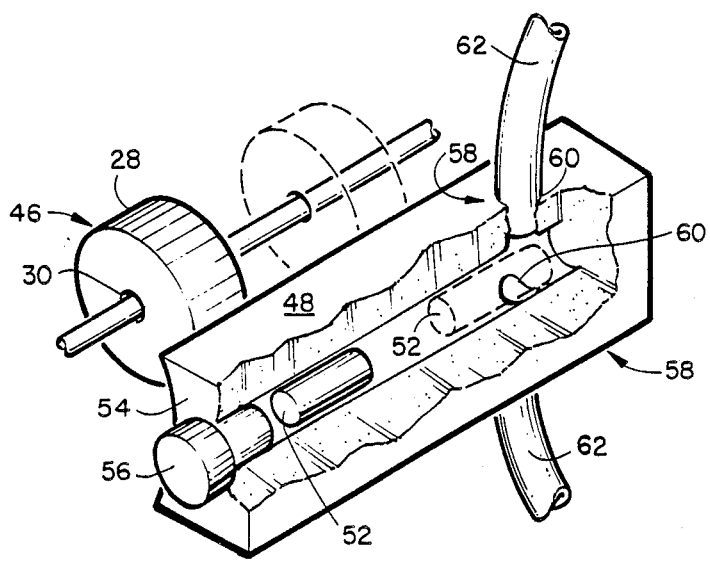
FIGURE 6
FIGURE 8
FIGURE 9
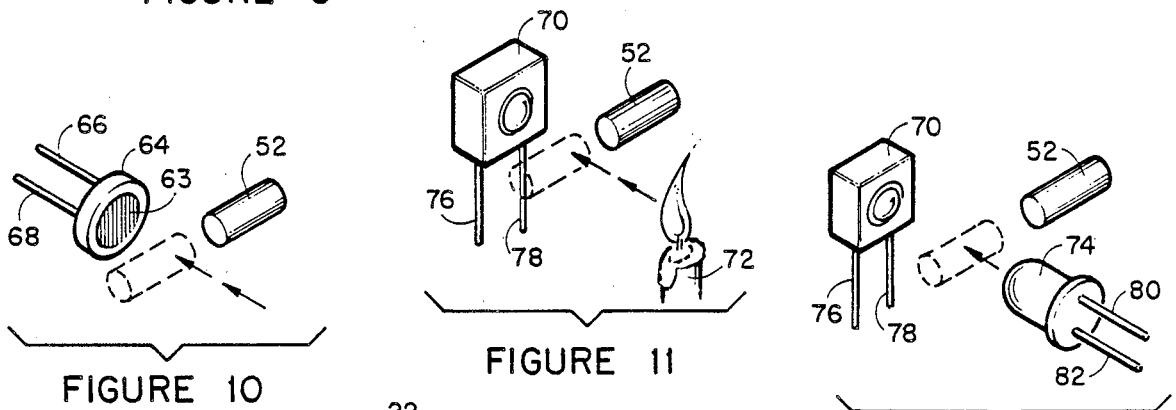
FIGURE 10
FIGURE 11
FIGURE 12
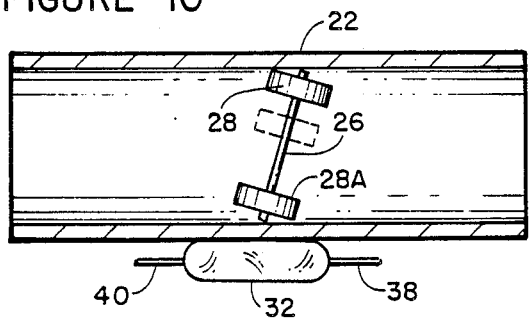
FIGURE 13
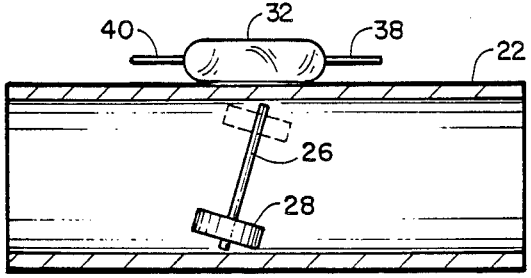
FIGURE 14
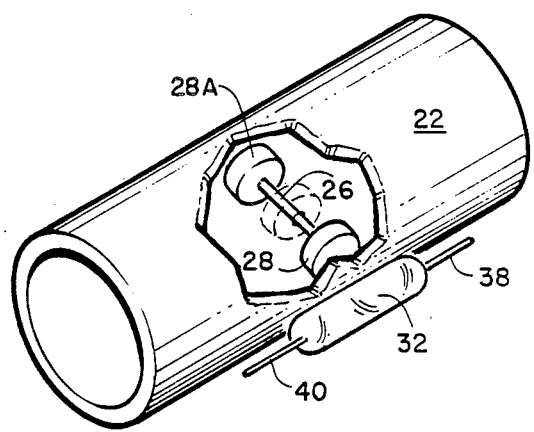
FIGURE 15

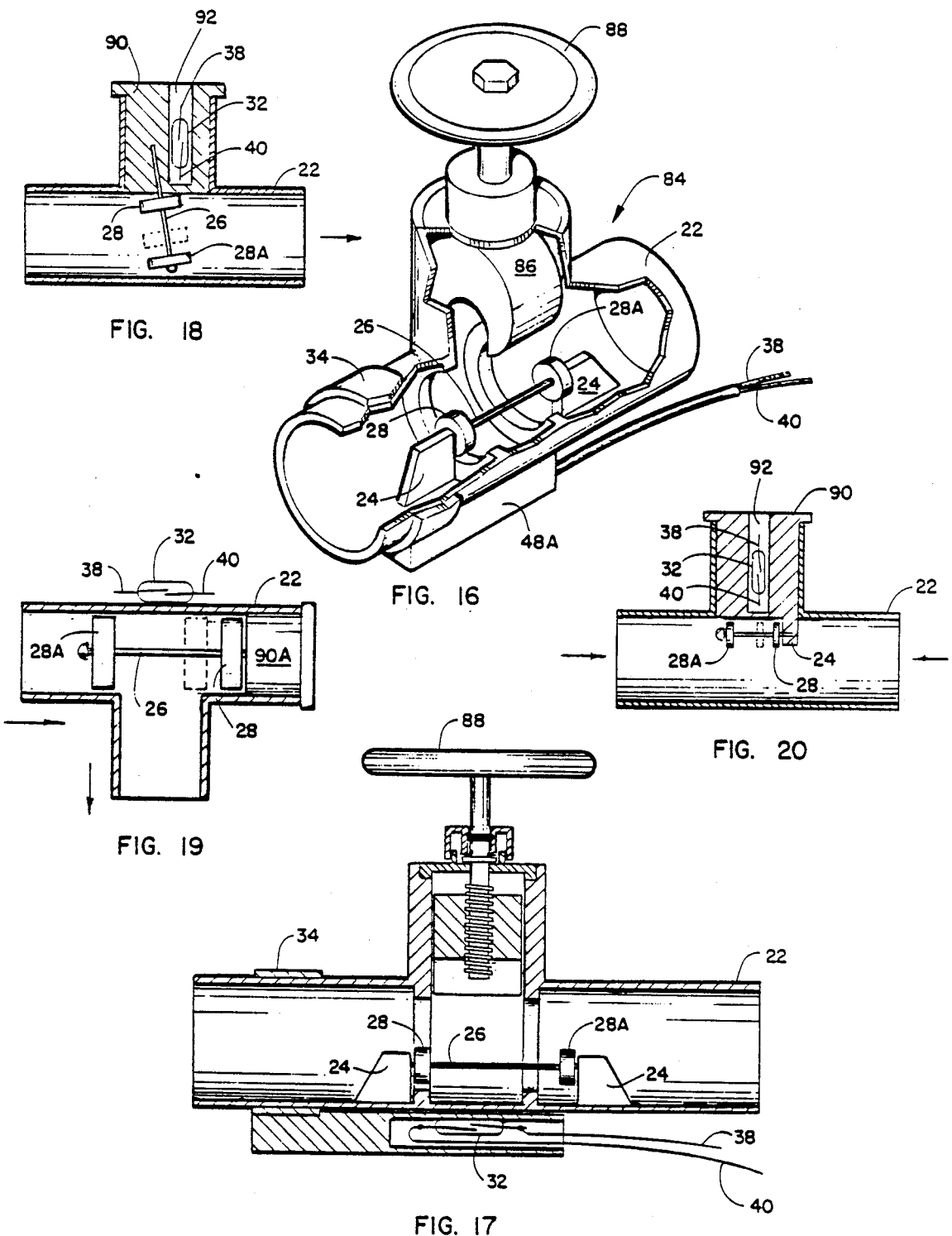

TRANSLATABLE DUAL MAGNETS

BACKGROUND OF THE INVENTION

The invention is directed to sensing the flow of a fluid in a conduit and or particulary to sensing the flow of liquid in a conduit and utilizing that sensing to operate external devices.

It is important to know whether or not a fluid is flowing and flowing sufficiently in a conduit which is either remotely located, is not transparent or is not constantly monitored or observed so that the fluid flow therethrough is not readily apparent to the observer.

There are several areas of concern where a constant flow of fluid is a very vital, important and necessary requirement to the continuing operation of certain devices. An example of these devices are internal combustion engines where the absence of cooling fluid results in their failure and destruction; Pumps where the fluid being pumped also acts as the cooling medium or the lack of a fluid flow results in a run-away condition which could destroy the pump; and any fluid transfer where knowledge that the transfer is in process is desired.

In my prior U.S. Pat. Nos. 4,524,736 and 4,615,303 devices are claimed the detect the flow in a conduit wherein a second conduit is positioned within a first conduit through which a fluid flows. The features in these patents are very effective in performing the functions to which they are directed; However, the features of the present invention perform equally as well as the referenced patents and the specific embodiments of the present invention require less operating components which reduce the possibility of encountering operational failure.

SUMMARY OF THE INVENTION

This invention is directed to a magnetic translatable member located and translatable influenced by the flow or the absence of a flow of a fluid in a conduit or other fluid transfer system which influences an adjacent magnet position sensing means. Various embodiments of the magnet member, sensing means and combination fluid flow control valve means.

An object of this invention is to provide a fluid flow detecting device or devices that detect the flow or absence of flow of fluid in a fluid transfer system.

Another object of this invention is to provided an optical means for detecting fluid flow in a conduit.

Still another object of this invention is to provide a fluid flow monitoring means that operates in combination of a fluid flow control valve.

Yet another object of this invention is to provide a fluid flow sensing device that is more economical to produce than prior art devices for use in a similar manner.

Further object and advantages of the present invention will become apparent as the following description proceeds and the features of the novelty which characterize this invention will be pointed out with particularity in the claims annexed to and forming a part of this specification.

BRIEF DESCRIPTION OF THE DRAWING FIGURES

FIG. 1 is a perspective showing of a first embodiment of the invention for indicating vertical fluid flow;

FIG. 2 is a perspective showing of a second embodiment of the invention for which can detect fluid flow in any positional attitude;

FIG. 3 is a side cut away showing of the device of FIG. 2;

FIG. 4 is a first embodiment of a flow detection sensing means of the invention;

FIG. 5 is a second embodiment of a flow detection sensing means of the invention;

FIG. 6, is a third embodiment of a flow detection sensing means of the invention;

FIG. 7 depicts a plurality of differently configured optic blocking elements for use in the FIG. 6 embodiment of the invention;

FIG. 8 depicts a fourth embodiment of the flow detection sensing means cf the invention;

FIG. 9 depicts a fourth embodiment of the flow detection sensing means of the invention;

FIG. 10 depicts a fifth embodiment of the flow detection sensing means of the invention;

FIG. 11 depicts a sixth embodiment of the flow detection sensing means of the invention;

FIG. 12 depicts a seventh embodiment of the flow detection sensing means of the invention;

FIG. 13 is a second embodiment of the FIG. 1 embodiment of the invention;

FIG. 14 is a third embodiment of the FIG. 1 embodiment of the invention;

FIG. 15 is a fourth embodiment of the FIG. 1 embodiment of the invention;

FIG. 16 is a perspective showing of a fifth embodiment of the invention employing a valve;

FIG. 17 is a side cutaway showing of the embodiment of FIG. 16;

FIG. 18 is a fifth embodiment of the invention utilizing a "T" connector;

FIG. 19 is a second embodiment of the "T" connector embodiment of FIG. 18; and

FIG. 20 is a third embodiment of the "T" connector embodiment of FIG. 18.

DETAILED DESCRIPTION OF THE PREFERRED EMBODIMENTS

Referring now specifically to drawing FIG. 1 which depicts the first embodiment of the flow detecting device 20 of the invention. This embodiment is designed to be employed only in an off horozontial plane as shown. The housing 22 of the device can be constructed of any non-ferrous material, such as plastic or the like. Generally this housing 22 can be constructed from PVC pipe of a commercially available diameter. Located within the housing are a pair of spaced apart shaft supports 24. The shaft supports are also constructed from a non-ferrous material like the housing 22. A shaft 26 spans the space between the shaft supports 24 and is held in a fixed position thereby. The shaft 26 like the housing and shaft supports is also constructed of non-ferrous material. A magnet 28 which has an aperture 30 centrally positioned at its center is translatably carried by the shaft 26. Positioned external of the housing 22 is a flow detection switch 32. Although the magnet 28 is shown in the various drawing figures as circular for ease of explanation, the magnet could take any shape to practice the invention. The flow detection switch is shown as a pair of contacts constructed from ferrous material positioned within a glass cylinder which is evacuated. The flow detection switch can be either normally open or closed as shown in FIGS. 9 and 8 respectfully. The flow detection switch 32 may be either fixedly or movably attached to the outer surface of the housing 22. When fixedly positioned the detection switch may, for example, be adhered directly to the housing, if the housing is constructed of PVC or the like, molded into the housing during construction, soldered if the housing is constructed of cooper, etc. The attachment of the detection switch may be by means of a collar 34. The collar 34 is also constructed of any suitable non-ferrous material. The longitudinal and rotational movement of the collar allows the switch 32 to be adjustably positioned relative to the magnet 28 for flow detection operation. After positioning, the collar may be fixed in position by means of adhesives, PVC cement or the like.

In use, a fluid flows in the direction of the arrow head 36, i.e. upward toward the top of the drawing FIG. 1. The flow of fluid causes the circular magnet 28 translate upward toward the top of the drawing FIG. along shaft 26. The magnet acts on the switch 32 and either closes a normally open switch or opens a normally closed switch. The positioning of the collar and switch relative to the elevated position of the magnet determines the amount of fluid flow required to activate the switch from one state to the other. A device, not shown, is connected to the terminals 38 and 40 of the switch 32 to detect the operating state of the switch by connecting a power source and detecting current flow or the absence of current flow through the switch.

Drawing FIGS. 4 and 5 depict different types of detection switches. Switch 36, of drawing FIG. 4, is a solid state Hall effect type switch which can be either digital or linear. The magnet 28 operates in the same manner as hereinbefore discussed. The switch of drawing FIG. 5 is a micro-switch 37 with a magnet 38 on the outside of the arm 40 with the magnetic pole of the magnet the same as the magnetic pole of the magnet 28, i.e. like poles repel. When the magnet 28 is positioned adjacent to the magnet 38 the magnet carried by the arm of the micro-switch is caused to be forced inward toward the switch body which is causes the switch to operate and change state. The leads 42 and 44 are connected to a power source and a detecting means as discussed above for detecting the state change of the micro-switch. Only one shaft support 24 is required in this embodiment.

Referring now to drawing FIG. 6, A cut-away showing of a second embodiment of an optic fluid flow detecting means 46 is depicted. A block 48 is shown which includes a longitudinal bore 50 with a ferrous member 52 translatably positioned therein, The bore 50 is terminated at one end by the end wall 54 of the block 48 and the other end is plugged with a plug 56. The ferrous member can take many different physical forms to practice the invention. Several differently configured ferrous members are shown in drawing FIGS. 6, 7 and 10-12. The block 48 also includes a bore 58 positioned through the block transverse to the bore 50. The bore 58 passes perpendicularly through the bore 50. Positioned in each opening 60 to the bore 58 is an optic fiber 62. One end of one of the optic fibers 62 is connected to a light source, as seen in FIGS. 11 and 12, and the other end of the other optic fiber is connected to a light sensing means, an example shown in FIGS. 10-12, which senses the absence and presence of light through the bore 58 in the block 48. In drawing FIG. 10 a light from a source, not shown, is either allowed to pass through the space formally occupied by the translatable member 52 or blocked by the position of the translatable member, as shown in phantom. The light is either directed to the receiving surface (face) 63 of a photo cell 64, as for example, a cadmium sulfide photo cell, or from the cell. The light striking the face of the photo cell causes a current to flow through leads 66 and 68 when they are connected to a sensing means, such as, a meter or the like, not shown.

Referring now to drawing FIG. 11 and 12, A source of light either from a flame shown as a candle 72 or an light emitting diode (LED) which transmits its light a light sensing means 70 such as, photo transistor, photo diode, infrared sensor, ultrasonic receiver or the like which generates a current between leads 76 and 78 when the translatable member is translated to its phantom position. A power source, not shown, provides voltage to leads 80 and 82 of the LED 74 to create the light source.

Referring now to drawing FIGS. 2 and 3, These figures depict a fluid flow device that can monitor or detect fluid flow in any attitude position of the device. In these figures a pair of circular magnets. 28 and 28A are positioned on the support shaft 26 with like poles adjacent. The switch 32 is positioned in the same manner as the switch of drawing FIGS. 1 and 3. In this embodiment, one of the magnets 28 or 28A is translated by and in the direction of the flow of fluid through the housing 22. The other magnet 28 or 28A is forced by the combined repulsion force of adjacent magnet 28 or 28A and the fluid flow against the closest shaft support 24. The influence of the magnetic force of the magnet 28 or 28A on the switch is as hereinbefore described. In the absence of flow through the housing, the magnets 28 and 28A are repulsed from each other in a normal manner and the switch returns to its normal state.

Referring specifically to drawing FIG. 13 and 15, the FIG. 13 is a top plan cutaway showing and FIG. 15 is a cutaway perspective showing of the device 20 having unidirectional flow sensing utilizing two circular magnets 28 and 28A. The switch 32 is positioned on the external surface of the housing and may be attached thereto by any convenient means.

FIG. 14, is a top plan view showing of the device 20 utilizing a single circular magnet 28.

The devices of the last mentioned three figures operate in the manner previously discussed.

Referring now to drawing FIGS. 16 and 17, These figures depict a gate valve 84 with the fluid flow sensing device 20 of the present invention. The valve member 86 of the gate valve which is vertically adjustable in a normally expected manner by operation of rotary handle 88. The gate includes a "C" shaped bottom surface. The Dimension of the "C" cut out is slightly larger than the circular magnets 28 and 28A. When the valve begins to close the flow rate increases in the area of the magnets therefore the flow has a greater force to translate one of the magnets, i.e. the valve is a means for sensitivity adjusting the detection means.

Drawing FIGS. 18-20 depict side cutaway showing of an embodiment of the invention utilizing a "T" rather than a straight tubular housing as shown in the various discussed and described embodiments. The function of the device is as discussed hereinbefore. In the FIG. 18 and 20 showings, a plug 90 is employed to block off the vertical fluid flow path and includes an elongated slot 92 for insertion of a switch 32 therein. In the FIG. 19 showing a plug 90A blocks one end of the horizontal and the input fluid flow direction is caused to exit the "T" at 90 degrees thereto and the switch 32 is located on the outside of the housing.

The fluid flow sensing devices and the various embodiments thereof are very useful in monitoring fluid flow in any conduit and for any purpose whatsoever.

Many changes may be made in details and materials of fabrication, in the configuration and assemblage of the constituent elements, without departing from the spirit and scope of the appended claims, which changes are intended to be embraced therewithin.

Having thus described the invention, what is claimed as new and useful and desired to be secured by U.S. Letters Patent is:

1. A fluid flow sensing device comprising:
A non-ferrous housing having an inside and outside surface;
two normally coaxially aligned spaced apart magnets of substantially the same dimensions each having a central bore, said magnets being separated by the influence of adjacent like poles and translatable within said housing by the flow of fluid through said housing;
a magnet support shaft carried by said housing on the inside surface thereof, said shaft is secured to said housing at least on one end and has a diameter slightly less than said bore, said magnets are supported thereby and are linearly translatable relative to said housing;
a magnet translation detection means; and
a positioning means for supporting said magnet translation detection mans, said positioning means carried by said housing on the outside surface thereof and positionable relative thereto for positioning said magnet translation detection means at a location along said housing relative to a translatable position of either of said magnets depending on the direction of fluid flow whereby when fluid flows in said housing of at least one of said magnets is translated and one of said magnets will have influence on said magnet translation detection means and the other magnet being out of the position of influence of said magnet translation detection means in the direction of flow.

2. The invention as defined in claim 1 wherein said non-ferrous housing is constructed of plastic.

3. The invention as defined in claim 1 wherein said non-ferrous housing is constructed of PVC plastic.

4. The invention as defined in claim 1 further comprising a valve member which cooperates with said magnets and is manually selectable for controlling the flow of said fluid through said housing acting on said magnets.

5. The invention as defined in claim 1 wherein said magnets are circular magnets.

6. The invention as defined in claim 1 wherein said, shaft is fixedly attached to said housing on both ends thereof.

7. The invention as defined in claim wherein magnet translation detecting means is a switch which has a pair of contacts constructed of ferrous material and said one of said magnets influences said switch to change between open and closed states.

8. The invention as defined in claim 1 wherein said magnet translation detecting means is a Hall effect switch.

9. The invention as defined in claim 1 wherein magnet translation detecting means is a micro-switch.

10. The invention as defined in claim 1 wherein said magnet translation detecting means is an optical detecting means wherein the translation of said magnet influences the flow of light between a source and a light detecting means.

11. The invention as defined in claim 1 wherein said means for supporting said magnet translation detector is fixedly positioned on said housing.

12. The invention as defined in claim 1 wherein said means for supporting said magnet translation detector is selectively translatable relative to said housing along said housing.

13. The invention as defined in claim 12 wherein said means for supporting said magnet translation detector is a collar member which surrounds said housing and has a friction fit therewith.

* * * * *